June 16, 1925.

L. J. STEPHENSON

MOTOR CONTROL SYSTEM

Original Filed Feb. 20, 1920    2 Sheets-Sheet 1

1,542,483

Inventor
Leigh J. Stephenson
By William Bradbury
Dee, Attorneys.

June 16, 1925.                                                       1,542,483
L. J. STEPHENSON
MOTOR CONTROL SYSTEM
Original Filed Feb. 20, 1920          2 Sheets-Sheet 2

Inventor
Leigh J. Stephenson
By Williams Bradbury
See    Attorneys

Patented June 16, 1925.

1,542,483

UNITED STATES PATENT OFFICE.

LEIGH J. STEPHENSON, OF OAKMONT, PENNSYLVANIA, ASSIGNOR TO B. V. BECKER, LEIGH J. STEPHENSON, GEORGE B. BURRAGE, WILLIAM T. FENTON, AND LYNN A. WILLIAMS, TRUSTEES, ALL OF CHICAGO, ILLINOIS.

MOTOR-CONTROL SYSTEM.

Application filed February 20, 1920, Serial No. 360,132. Renewed October 4, 1924.

*To all whom it may concern:*

Be it known that I, LEIGH J. STEPHENSON, a citizen of the United States, and resident of Oakmont, in the county of Allegheny and State of Pennsylvania, have invented a certain new and useful Improvement in Motor-Control Systems, of which the following is a full, clear, concise, and exact description, reference being had to the accompanying drawings, forming a part of this specification.

My invention relates to improvements in motor control systems and is especially concerned with improvements in a system of motor control such as that disclosed in United States Reissue Letters Patent No. 14,667 issued to me January 6, 1920. In this patent I have disclosed means for controlling the operation of a motor having a field winding comprising a regulating dynamo connected in series with the field winding of the motor to form a field winding circuit upon which a potential is impressed in a direction opposite to the counter-electromotive force of the regulating dynamo. The regulating dynamo is provided with a field winding which is connected in parallel with the field winding of the motor, an adjustable rheostat being connected in series with the field winding of the regulating dynamo to control the flow of current through the regulating dynamo field winding. The regulating dynamo is mounted upon the shaft of the motor so as to rotate at a speed constantly proportional to the speed of the motor.

In some applications of this means for controlling the operation of the motor, it is undesirable to mount the regulating dynamo armature upon the armature shaft of the motor or in fact to provide any kind of a mechanical connection between the motor and the regulating dynamo whereby the regulating dynamo will be caused to operate at speeds substantially constantly proportional to the motor.

The object of my present invention is, therefore,

First: Specifically speaking, to provide means not including a mechanical connection for causing the regulating dynamo in systems of control similar to that disclosed in my aforementioned patent to operate at speeds substantially constantly proportional to the motor, and Second: Broadly speaking, to provide non-mechanical means for causing two direct motors to operate at speeds substantially constantly proportional to each other.

Other objects will appear as this description progresses, reference being had to the accompanying drawings in which—

Throughout the several views, similar reference characters will be used for referring to similar parts.

Figure 1:
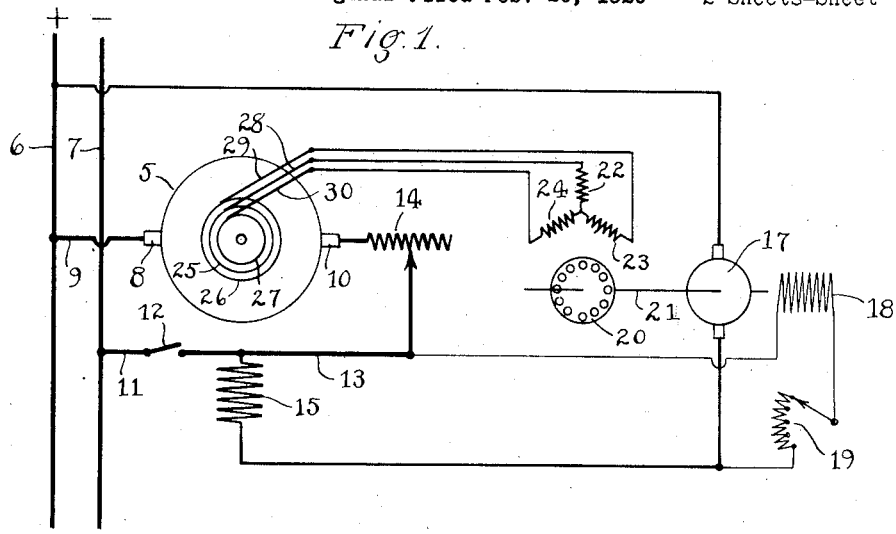
Figure 1 is a more or less diagrammatical view showing certain portions of the mechanical elements of my invention and illustrating the electrical connections.

Referring to Figure 1, reference character 5 indicates the armature of the motor, the operation of which is to be controlled and which receives current from the power lines 6, and 7, the brush 8 of the motor being connected with the line 6 by the conductor 9 and the brush 10 thereof being connected with the line wire 7 by conductor 11, line switch 12, conductor 13, and adjustable starting resistance 14.

The motor is provided with a field winding 15 which is connected in series with the armature 17 of the regulating dynamo to form a field winding circuit which, as shown, is connected directly across the line wires. The regulating dynamo is provided with a field winding 18 which is connected in parallel with the field winding 15 of the motor, an adjustable rheostat 19 being connected in series with the field winding 18 by the regulating dynamo.

The apparatus thus far described is the same as that described and claimed in my reissue patent above referred to. As stated above, this patent discloses a mechanical connection between the regulating dynamo armature and the armature of the motor whereby the regulating dynamo is caused to operate at a speed constantly proportional to the speed of the motor.

I shall now describe the means whereby I accomplish this same result without the use of a mechanical connection between the motor and the regulating dynamo. To do this I mount the squirrel cage rotor 20 of an induction generator upon the shaft 21 of the regulating dynamo.

The reference characters 22, 23 and 24 indicate the field windings of the induction generator which is illustrated as being of the 3 phase type. Mounted upon the same shaft with the armature 5 of the motor are three collector rings 25, 26 and 27 which are connected with points in the armature winding equally spaced from each other electrically thereby in effect converting a motor into a 3 phase rotary converter. The amount of power which the AC end of this rotor has to handle is, however, so small relative to the power handled by the DC end that it is to all intents and purposes merely a direct current motor. The stator windings 22, 23 and 24 are connected with the slip rings 25, 26 and 27 respectively by the brushes 28, 29 and 30 respectively.

With the arrangement shown, when the line switch 12 is closed, the motor armature will begin to rotate and can be accelerated by first cutting out the adjustable resistance 14 and then operating the adjustable rheostat 19 to exclude resistance from the filed winding circuit of the regulating dynamo in the manner described in my patent above referred to. When the line switch 12 is closed, the armature of the regulating dynamo will also begin to rotate and will drive the induction generator which will generate an alternating current which will tend to drive the motor armature as a synchronous motor. The counter-electromotive force of the armature 5 impressed on its collector rings will, of course, be a definite percentage of its DC counter-electromotive force and any attempt on the part of the regulating dynamo to drive the rotor of the induction generator at a speed greater than that sufficient to generate a voltage slightly in excess of the counter-electromotive force of the motor armature 5 will cause such an increased load to be placed upon the induction generator that the regulating dynamo will be unable to increase its speed further; consequently the speed of the regulating dynamo will always be limited by the speed of the motor armature 5 and while it will always slightly exceed the speed of the motor armature 5, its speed will nevertheless remain substantially constantly proportional to the speed of the motor armature.

In bringing a vehicle which is equipped with my control apparatus to a stop, an adjustable rheostat 19 will be adjusted to include all of its resistance in the field winding circuit of the regulating dynamo whereby the counter-electromotive force of the regulating dynamo is reduced to substantially zero so that the torque of the regulating dynamo is practically zero. This being the case the induction generator will be required to deliver but a small amount of power to the motor armature 5 and there will consequently be no heavy currents flowing through the induction generator windings at low speeds.

Figure 2:
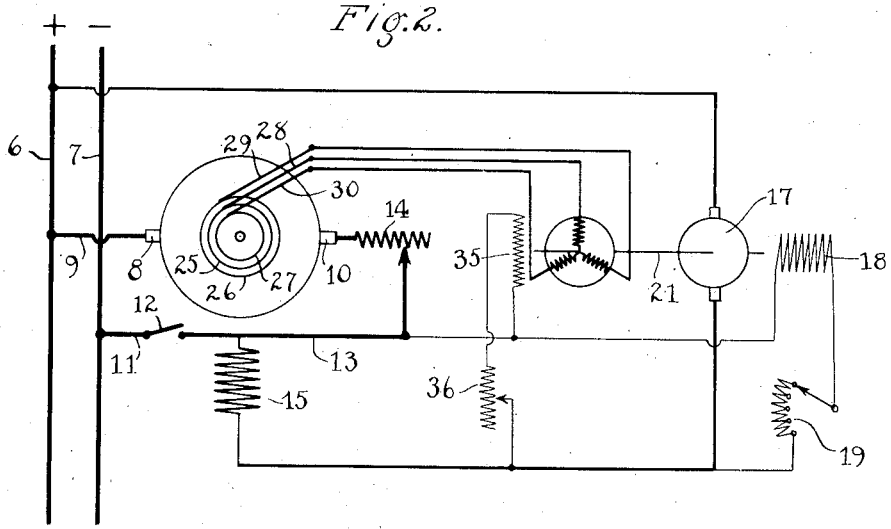
Figure 2 is a view similar to Figure 1 but showing a modified embodiment of my invention.

In the embodiment of my invention illustrated in Figure 2, I have substituted a synchronous 3 phase generator for the induction motor in the embodiment of my invention illustrated in Figure 1.

The field winding 35 of the synchronous motor is connected in parallel with the field winding 15 of the motor. This connection is necessary because the voltage which it is necessary for the synchronous generator to generate in order to run in synchronism with the main motor will always be a definite percentage of the DC voltage applied to the main motor terminals and in order to generate this voltage the field of the synchronous motor must vary in exactly the same way as the field of the main motor. With such an arrangement it is necessary that the magnetization curves of the synchronous motor and the main motor be substantially the same. If they are not the power factor of the synchronous generator will be less than 1. This can be partially corrected by means of the small rheostat 36 connected in series with the field winding of the synchronous generator which can be initially adjusted to correct the power factor.

With the above exceptions, the arrangement shown in Figure 2 is similar to that shown in Figure 1 and functions in substantially the same manner.

In my patent above referred to I have explained that with one speed of the regulating dynamo relative to motor speed, the motor will exhibit substantially the characteristics of a series motor. If the speed of the regulating dynamo is increased relative to the speed of the motor, the regulating dynamo will exhibit the characteristics of a shunt motor. By means of the arrangement shown in Figure 3, I am enabled to change the speed of the regulating dynamo relative to the motor so as to give the motor either series or shunt characteristics as desired. In this figure the windings 22, 23 and 24 are connected in delta in place of in star, as shown in Figure 1 and taps 40, 41 and 42 are led from the apexes of the delta connection to the clips 43, 44 and 45 of a triple pole double throw switch. Other taps 46, 47 and 48 are taken off from the middle points of the windings and led to the clips 49, 50 and 51 respectively of the triple pole double throw switch. The conductors 52, 53 and 54 lead to the brushes 28, 29 and 30 on the main motor. The hinge terminals 55, 56 and 57 of a triple pole single throw switch are connected with the taps 40, 41 and 42 respectively, and the clip terminals 58, 59 and 60 are short circuited by the conductor 61. With the triple pole single throw switch open and the triple pole double throw switch thrown to the left, the induction generator will have just half the poles that it has when the triple pole single throw switch is closed and the triple pole double throw switch is thrown to the right. With the connections first described, the induction generator will have to rotate twice as fast to generate current of the same frequency as will be necessary with the connections last described. Consequently, if the regulating dynamo is so designed as to give the main motor the characteristics of a shunt motor when the single throw switch is open and the double throw switch is closed to the left, it will be rotated at half speed for any given speed of the motor when the single throw switch is closed and the double throw switch is closed to the right, and the main motor will be given series characteristics. The arrangement shown in this figure is a well known arrangement for changing the speed of induction motors.

Figure 4:
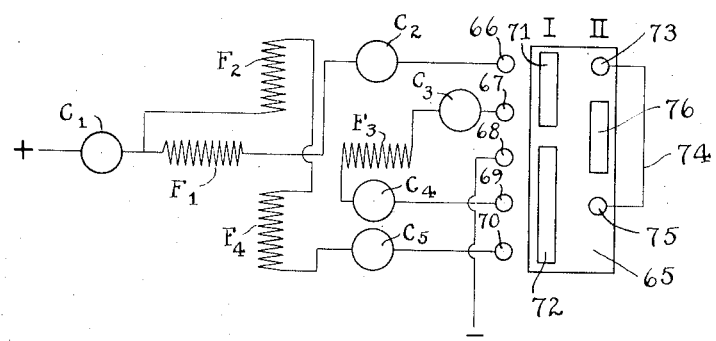

In Figure 4, I have illustrated connections for the field winding of the synchronous motor shown in Figure 2, whereby its speed can be doubled.

In Figure 2 I have used the conventional illustration of a synchronous generator wherein the alternating current is illustrated as forming the rotary part of the generator. It will, of course, be apparent that the same results would be obtained if the direct current winding formed the rotor of the motor.

I shall now describe means whereby the speed of the synchronous generator and consequently of the regulating dynamo can be changed relative to the speed of the direct current motor. The means which I have illustrated and described for this purpose contemplate the use of a synchronous generator having a rotary field. To change the speed of a synchronous generator or motor, it is necessary to change the number of poles in both the stator and rotor windings. To change the number of poles in the stator winding which will be the alternating current winding of the generator under consideration, I can make use of the wiring connections illustrated in Figure 3. As I have already described how these connections may be used for doubling the poles of a generator, I shall not again describe this feature in detail. To change the number of poles in the field winding, I make use of the connections illustrated in Figure 4.

In this figure the reference characters $F_1$, $F_2$, $F_3$ and $F_4$ indicate the field windings of a 4 pole rotary field synchronous converter and the reference characters $C_1$, $C_2$, $C_3$, $C_4$ and $C_5$ indicate the necessary slip rings for conducting current to and from the field windings. The reference character 65 indicates the movable part of a rotary switch, the contacts of which are adapted to be brought into contact with the stationary contacts 66, 67, 68, 69 and 70. With this switch in position I current flows from a positive source through slip ring $C_1$, field winding $F_1$, slip ring $C_2$, contact 66, contact 71, contact 67, slip ring $C_3$, field winding $F_3$, slip ring $C_4$, contact 69, contact 72 and contact 68 to the negative side of the source of supply. Current also flows from a positive source through field windings $F_2$ and $F_4$, slip ring $C_5$, contact 70, contact 72 and contact 68 to the negative side. This causes the field windings $F_1$, $F_2$, $F_3$, and $F_4$ to form alternating north and south poles. Assuming that $F_1$ is a south pole, $F_2$ will be north, $F_3$ south and $F_4$ north.

Figure 3:
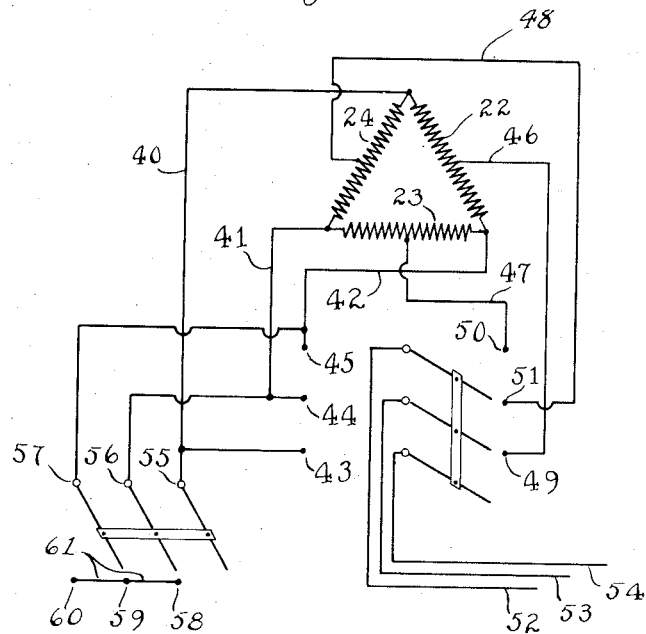
Figure 3 is a diagrammatic sketch disclosing electrical connections whereby the speed relation between the motor and the regulating dynamo in the embodiment of my invention shown in Figures 1 and 2 can be changed and Figure 4 is a view similar to Figure 3 but disclosing means applicable to the modification of my invention shown in Figure 2.

With the above connections for the field windings, the connections for the stator windings would be determined by throwing the double throw switch in Figure 3 to the right and closing the single throw switch.

If now the rotary switch is turned to position II current will flow from the positive side of a source of current through the slip ring $C_1$, field winding $F_1$, slip ring $C_2$, contact 66, contact 73, conductor 74, contact 75, contact 69, slip ring $C_4$, field winding $F_3$, slip ring $C_3$, contact 67, contact 76 and contact 68 to the negative side of the source. The circuit through field windings $F_2$ and $F_4$ is open. With these connections $F_1$ is a south pole and $F_3$ a north pole. In other words, by these connections, one half of the field winding circuits are opened and the field winding $F_3$ is reversed, thereby producing a generator having half the poles that it has when the rotary switch 65 is in position I.

With the above described connections for the field winding, the proper connections for the stator winding would be formed by throwing the double throw switch in Figure 3 to the left and opening the single throw switch.

If the field windings of the synchronous motor shown in Figure 2 are excited by means of the arrangement shown above, the synchronous motor will rotate at one speed with the rotary switch 65 in position I and at twice this speed when the rotary switch is in position II, thereby giving the same effect that may be obtained with the arrangement shown in Figure 3 when used in connection with the induction motor of Figure 1. It will, of course, be understood that, if desired, the arrangement shown in Figures 3 and 4 can be modified to triple, quadruple or in fact multiply the number of poles of the induction or synchronous generators as many times as desired thereby changing the speed ratio of the regulating dynamo relative to the motor as may be desired.

It will, of course, be clearly understood that the means which I have described for changing the speed of the regulating dynamo relative to the motor are merely illustrative and that any of the other well-known means for changing the speed of alternating current motors might be employed for the same purpose.

While I have described the details of the preferred embodiment of my invention, and while I have described it in connection with the control of a motor designed to operate a motor driven vehicle, it is to be clearly understood that my invention is not limited to these details nor to this application, but is capable of other adaptations and modifications within the scope and spirit of the appended claims.

Having thus described my invention, what I claim is:

1. The combination with a motor having a field winding of a regulating dynamo connected in series with said field winding to form a field winding circuit, means for impressing a potential on said field winding circuit in a direction to oppose the counter-electromotive force of said regulating dynamo, a field winding for said regulating dynamo connected in parallel with the field winding of said motor, means for varying the ratio of the currents in said field windings, and means for causing said regulating dynamo to operate at a speed constantly proportional to the speed of said motor comprising an alternating current dynamo mechanically connected with said regulating dynamo, slip rings connected with the armature of said motor, electrical connections between said slip rings and said alternating current dynamo, and a field winding for said alternating current dynamo connected in parallel with said motor field winding.

2. The combination with a motor having a field winding of a regulating dynamo connected in series with said field winding to form a field winding circuit, means for impressing a potential on said field winding circuit in a direction to oppose the counter-electromotive force of said regulating dynamo, a field winding for said regulating dynamo connected in parallel with the field winding of said motor, means for varying the ratio of the currents in said field windings and means for causing said regulating dynamo to operate at a speed constantly proportional to the speed of said motor comprising an alternating current dynamo mechanically connected with said regulating dynamo, slip rings connected with the armature of said motor, electrical connections between said slip rings and said alternating current dynamo.

3. The combination with a direct current motor having a field winding circuit, of a dynamo for controlling the current through said field winding circuit and means for causing said dynamo to operate at a speed constantly proportional to the speed of said motor, comprising an alternating current dynamo mechanically connected with said dynamo, slip rings connected with the armature winding of said motor and electrical connections between said alternating current dynamo and said slip rings.

4. The combination with a direct current motor having a field winding circuit, of a direct current dynamo for controlling the current through said field winding circuit, and means for causing said direct current dynamo to operate at a speed constantly proportional to the speed of said motor comprising an alternating current dynamo mechanically connected to said direct current dynamo and electrical connections between said alternating current dynamo and the armature of said direct current motor.

5. The combination with a direct current motor having a field winding circuit, of a direct current dynamo for controlling the current through said field winding circuit, and means for causing said direct current dynamo to operate at a speed constantly proportional to the speed of said motor comprising an alternating current generator mechanically coupled to said direct current dynamo, and means for loading said alternating current generator comprising alternating current connections with the armature of said direct current motor.

6. The combination with a motor having an alternating current end and a direct current end and a field winding for the direct current end of said motor, of a second motor of smaller capacity than said first named motor connected in series with said field winding, the said second motor being a direct current motor and means for causing said second motor to operate at a speed substantially constantly proportional to the speed of said first named motor, comprising an alternating current generator driven by said second motor and supplying current to the alternating current end of said first named motor.

In witness whereof, I hereunto subscribe my name this 16th day of February, 1920.

LEIGH J. STEPHENSON.

Witnesses:
 EARL F. PIERCE,
 EDNA V. GUSTAFSON.